United States Patent [19]

Bone

[11] 4,039,689

[45] Aug. 2, 1977

[54] SOFT DRY PET FOOD PRODUCT AND PROCESS

[75] Inventor: David P. Bone, Palatine, Ill.

[73] Assignee: The Quaker Oats Company, Chicago, Ill.

[21] Appl. No.: 654,931

[22] Filed: Feb. 3, 1976

[51] Int. Cl.² .............................................. A23J 3/00
[52] U.S. Cl. ...................................... 426/99; 426/103; 426/250; 426/302; 426/623; 426/635; 426/656; 426/658; 426/516; 426/805
[58] Field of Search ................ 426/249, 250, 72, 103, 426/805, 99, 623, 635, 502, 99, 657, 302, 658, 656

[56] References Cited

U.S. PATENT DOCUMENTS

| 3,380,832 | 4/1968 | Bone | 426/805 |
|---|---|---|---|
| 3,883,672 | 5/1975 | Bone | 426/805 |
| 3,897,572 | 7/1975 | Riggs | 426/805 |

*Primary Examiner*—Jeanette M. Hunter
*Attorney, Agent, or Firm*—Mathew R. P. Perrone, Jr.

[57] ABSTRACT

A soft dry pet food is made using a starch-derived polysaccharide having a dextrose equivalent of 6-35, a polyhydric plasticizing agent, a protein source and various additives.

32 Claims, No Drawings

SOFT DRY PET FOOD PRODUCT AND PROCESS

BACKGROUND OF THE INVENTION

This invention relates to a pet food, and more particularly to a soft dry pet food.

Within the class of pet foods, there are three basic types of pet food. A first type of pet food is a moist pet food generally having more than 50 percent by weight moisture therein. This pet food is highly palatable and requires aseptic canning conditions to stabilize the pet food for marketing purposes. A second type of pet food is a semi-moist pet food. The semi-moist pet food generally contains about 15 to about 50 percent by weight moisture. The semi-moist pet food does not require aseptic canning. It is stable when wrapped in standard polyethylene packages or other conventional packages. The semi-moist pet food requires no aseptic canning in order to be stable. A third type of pet food is the dry pet food. This pet food contains up to about 15 percent moisture by weight and is the most stable of the three classes of pet foods. By "up to" is meant at least some moisture is present. This pet food requires neither the aspectic canning of the moist pet food nor the wrapping of the semi-most pet food. The dry pet food is merely put in bags or boxes and is unaffected by long periods of storage. This dry pet food maintains its characteristics over long periods of storage and is therefore easier to store and handle than either the semi-moist or the moist per food. By moisture content is meant the total water content of the pet food, whether the water was added as free water, a component of the ingredients used in the pet food, or mixtures thereof.

While a dry pet food is additionally very nutritional, it nevertheless is not a particularly acceptable pet food in some cases to either the pet or the pet owner. The moisture content adds to the palatability of a pet food. The low moisture content of a dry pet food indicates a generally low palatability for the pet food. Furthermore, a dry pet food has a tendency to be hard to the point where it is unappetizing to both the pet owner and the pet. Furthermore, the appearance of a hard dry pet food detracts from its acceptability to both the pet owner and the pet. Thus, it may be seen that a dry pet food possibly has its storage advantages and nutritional advantages outweighed by inferior palatability and appearance.

Dry pet foods are commonly produced by preparing a farinaceous-proteinaceous mixture containing vitamins, minerals, fats, flavorants, colorants and water to a level of 20 percent to 40 percent by weight and cooking the mixture by use of a continuous extrusion-cooker whereby the dough is heated to 212° F. to 300° F. or more and expelled through a die, cut into bite size pieces, cooled, dried, and packaged. The elevated temperature is required to cook the starch and alter the mixture so as to form the typical hard, cohesive, dry pet food product.

Thus, conventional dry pet foods are typically hard and brittle. The hardness and brittleness is commonly imparted by the amylaceous and/or proteinaceous ingredients that are commonly used in conventional dry pet foods and which form essentially a continuous starchy and/or proteinaceous phase throughout the pet food; such starch and/or proteinaceous continuous phase being in a crystalline and/or a glassy state of matter. The continuous phase of crystalline or glassy matter in conventional dry pet foods is produced by the action of hydration - dehydration during the heating processing at temperatures typically well in excess of the minimal temperature required to significantly hydrate starch and/or proteinaceous sources, and as a consequence of subsequent cooling and drying to the moisture levels typical in conventional dry pet foods.

There are some soft dry pet foods which are processed at temperatures and conditions which are similar to those used to produce conventional hard and brittle dry pet foods — i.e. — temperatures in excess of 212° F. and which obtain their soft crumb structure by virtue of a plasticized expanded texture imparted by a unique combination of formula and process method. However, such expanded texture, albeit having a soft crumb structure, has the distinct appearance marketing disadvantage in that the expanded texture does not simulate the highly-desired texture of typical meat.

Furthermore at least one soft dry pet food is known which is not expanded and which is processed at temperatures of at least 145° F., a temperature sufficient to significantly hydrate (gelatinize) amylaceous ingredients. However, this soft dry non-expanded pet food contains ingredients which are not as readily available as is required to provide an economical product. Furthermore, the amylaceous ingredients, if used, are used at limited levels, below the levels typically used in conventional dry pet foods.

Thus, it may be seen that problems still exist in the preparation of a dry pet food which is soft, more appetizing, palatable, and better appearing than the customary pet foods of the dry type known in the art.

SUMMARY OF THE INVENTION

Therefore it is an object of this invention to provide an improved soft dry pet food.

It is a further object of this invention to provide a soft dry pet food utilizing more readily available ingredients.

A still further object of this invention is to provide a soft dry pet food having improved appearance.

Also an object of this invention is to provide a soft dry pet food having improved palatability.

Another object of this invention is to provide a process for making a soft dry pet food out of more readily available ingredients.

Yet another object of this invention is to provide a process for making a soft dry pet food having an improved appearance.

Still another object of this invention is to provide a process for making a soft dry pet food having improved palatability.

These and other objects of this invention are met by combining a starch-derived polysaccharide source, a polyhydric plastizing agent, a protein source, and other additives to form a proteinaceous mixture suitable for forming into a soft dry pet food. A further object of this invention is to provide a marbled dry pet food by blending a sheeted white dough into a red dough while mixing the red dough.

The process of this invention provides a dry pet food having superior palatability and meaty-like appearance and pleasing soft meaty-like texture which can be produced from readily available ingredients by processing the proteinaceous mixture containing a starch-derived polysaccharide at process temperatures less than about 130° F.

DESCRIPTION OF THE PREFERRED EMBODIMENTS

A soft dry pet food is formed from a polyhydric plasticizing agent, a starch-derived polysaccharide source, and other additives. When a sheet of white dough is mixed into a red dough of the soft dry pet food formulation, a marbled effect is achieved. This formulation avoids the use of proteinaceous adhesives.

One specific component of the soft dry pet food is a starch-derived polysaccharide source. This starch-derived polysaccharide source provides nutritional calories and functionally aids in forming a desired soft meat-like texture.

There are many types of starch-derived polysaccharide sources. The type of starch-derived polysaccharide source that is especially suited for this invention has the following carbohydrate content:

|  | Weight % |
|---|---|
| Monosaccharides | 0.0 to 1.0 |
| Disaccharides | 2.0 to 6.0 |
| Trisaccharides | 2.5 to 8.0 |
| Tetrasaccharides | 2.0 to 7.0 |
| Pentasaccharides | 1.0 to 6.0 |
| Hexasaccharides | 3.0 to 9.0 |
| Heptasaccharides | 4.5 to 10.0 |
| Higher saccharides | 8.0 to 53.0 |
| (dextrose equivalent) | ( 9 to 25 ) |

Examples of commercially available starch-derived polysaccharides that meet these specifications are Maltrin 10, Maltrin 15, and Maltrin 20 as produced by Grain Processing Corporation, Muscatine, Iowa. A suitable starch-derived polysaccharide may also be obtained by a diastatic treatment consisting of a cooked slurry of oat flour, or wheat flour, or starch, plus barley malt flour or the enzymes therefrom, to produce a modified dextrin-rich product having a highly preferred dextrose equivalent in the range 9 to 25. A broader dextrose equivalent range of 6 to 35 is also operable, but a dextrose equivalent outside of the broad range is inoperable.

Starch derived polysaccharide is generally present in the soft pet food at a range of about 20 to about 40 percent. More particularly, the range of the converted starch source is 20 to 35 percent. Most specifically the range of the converted starch source is 20 to 30 percent.

A second required component for use in the soft pet food of this invention is a polyhydric component which serves both a plasticizing and a humectant function. This polyhydric component is a texturizing aid in lubricating the dry components and aids in the prevention of moisture loss which leads to hardening of the dry pet food. Specifically, the plasticizing and humectant agent is usually selected from the group consisting of sorbitol, propylene glycol and glycerine. These components are generally present at a level of about 3 percent to about 12 percent by weight of the pet food. More specifically, the level of the plasticizing and humectant agent is 5 percent to 12 percent. Most specifically, the level of the plasticizing and humectant agent is 8 percent to 10 percent. Sorbitol is the preferred plasticizing and humectant agent because sorbitol solutions do not lose moisture as rapidly as glycerine or glycol solutions when exposed to low humidities such as may occur during storage of the dry pet food.

Another required component for this pet food is a sufficient amount of a mold inhibitor (also known as an antimycotic). Generally, the mold inhibitor is present in the soft dry pet food at a level of about 0.01 to 0.2 percent. Typical mold inhibitors include potassium sorbate, calcium propinate, sorbic acid, propionic acid, methylparaben, sodium benzoate, and pimaricin.

A protein source is also critical for this soft dry pet food and is present in amounts up to about 60 percent by weight of the pet food. The protein source is either a vegetable protein source, an animal derived protein source, a dried animal by-product, or a combination thereof. The critical thing about the protein source is that it provide the nutritional and legal requirements for the protein in the product. Generally speaking, the protein content on a dry basis in the pet food must be at least 15 percent, and more preferably 22 percent to 40 percent. Other levels are supplied depending on the type of pet being fed. A dog food protein content is advantageously about 22 percent to less than 30 percent by weight of the pet food on a dry basis while a cat food protein content is advantageously about 30 percent or above by weight on a dry basis. The adjustment in the levels of the protein source raise the protein content on a dry basis to the required level for the particular pet. One advantage of this invention is that the protein source is not a proteinaceous adhesive, which tends to be not readily enough available to provide for an economical pet food.

A vegetable protein source is suitable for providing the required protein content of this pet food. Generally speaking, while the total protein requirements must be in the ranges defined above, up to about 40 percent of a vegetable protein source is suitable for use in this invention. More particularly, a suitable level of vegetable protein source used in the pet food is about 15 percent to about 35 percent. Most specifically, a suitable level of vegetable protein includes 20 percent to 30 percent. Soy flour is a preferred vegetable protein because of its ready availability and high protein content. However, solvent soybean meal, peanut flour, peanut meal, cottonseed flour, and soy protein concentrate are highly suitable for use in this soft dry pet food. Additionally, mixtures of the above-mentioned vegetable proteins may also be used in the soft dry pet food of this invention. An animal protein source, such as a meat, a meat by-product or mixtures thereof as defined in U.S. Pat. No. 3,380,832 to Bone incorporated herein by reference may also be used alone or in combination with the vegetable protein source in the above percentage ranges, so long as the total required protein content as above defined is met.

Another protein source as mentioned above is dried animal by-products. Typical animal by-products include meat and bone meal. These meals are not generally classified as meat because of their low moisture content. The level of meat and bone meal used in this soft dry pet food is generally from up to about 18 percent. More specifically, the meat and bone meal is present at about 5 percent to about 15 percent. Most specifically, the meat and bone meal is present at about 8 percent to 14 percent. The meat and bone meal serves as a protein source, a flavorant, and a texturizing aid. Here and throughout the specification by "up to" is meant at least a trace amount of the named ingredient is present.

Usually, an emulsifying agent is used to provide ease of processing and a texturizing agent to aid in developing the soft pliable meat-like texture. Generally, the emulsifying agent is present at a level of about 0 to about 5 percent. More particularly the emulsifying agent is present at a level of about 1 percent to 3 percent. Typical emulsifying agents include those of the lecithin class. More specifically, soy lecithin is a very suitable emulsifying agent.

Since calcium and phosphate are essential to nutrition, about 0 to about 5 percent by weight of a calcium-phosphorus source is desirable. Typical materials for providing the calcium and phosphorus include defluorinated phosphate, and dicalcium phosphate. More specifically, a suitable level of the calcium phosphorus source is about 3.5 percent to about 4.5 percent.

Generally the moisture content of the pet food is up to 15 percent. More preferred is a moisture content of 5 percent to 14 percent. Most preferred is a moisture content of 8 percent to 12 percent.

Other additives may be included in this pet food at 0 to about 5 percent by weight of the pet food. These additives must be materials which do not interfere with the formation of the desired soft and dry pet food. Typical materials for addition herein include vitamin and mineral mixture. These additives, if necessary, can be added to make a suitable nutritious pet food designed for a specific purpose.

While it is not desired to be bound by any particular theory, the above-referenced components are believed to combine to make a soft dry pet food. These components are treatable at low temperature to make the soft dry pet food. This particular mixture of components forms the soft dry pet food because they are processed at low temperatures. This low temperature process leads to the soft dry nature of this pet food.

If any crystals are produced during the process of forming the pet food of this invention, they are not organized in such a fashion so as to produce a hard, dry, brittle pet food. Thus, the ingredients of the pet food of this invention formed into a soft dry pet food by the process of this invention lead to a soft dry pet food. Generally, the water activity of this soft, dry pet food ranges from about 0.60 to about 0.75. More preferably, the water activity is 0.65 to 0.75.

Relative hardnesses of this pet food range from about 1.5 to about 3.5. This is in contrast to the hard dry pet food rating of about 80 wherein the lower numbers imply a softer food. More preferably, the relative hardness of this pet food is about 1.7 to 2.5. Most preferably the relative hardness is about 1.9 to 2.1. Basically however, the difference between a hard and dry pet food of the prior art and this soft and dry pet food with respect to hardness is well known in the art. Thus the hardness ranges set forth above are given by way of example only and are not intended to be limiting. The hardness values as referenced above are determined by advancing a 60° conical penetrator into the respective product samples and using an Instron load-measuring system to obtain numbers and values measured in kilograms of force increase per centimeter of penetrator motion into the product.

Generally the process for forming a pet food of this invention consists in a process for producing a soft, dry pet food which comprises: preparing a proteinaceous mixture containing from 20 to about 40 percent by weight of a starch-derived polysaccharide; mechanically working the mixture with or without admixture of sheets of separately prepared dough of a different color to impart a marbling effect, at a temperature less than about 130° F. so as to make a stiff dough; and forming the dough into bite-size pieces or strands by extrusion or by other means at less than about 130° F. to give a meaty-like product.

When the components are first added to a suitable container for mixing to form the pet food, the appearance of the components as added is similar to that of a mixture of various sands — each of the sands usually being a different color. They are small particulate powder type components having no particular adhesion to each other. There is no indication that these components form a suitable pet food. However, upon mixing, for a sufficient period of time to form a homogenous mixture of all the components, a dough is formed. Once the dough appearance is achieved, it is then possible to shape the dough into the desired pet food forms. Thus, the problem of forming a soft dry pet food at low temperatures is solved by using the particular ingredients mentioned in the specification within the combination ranges set forth and applying to that particular composition a low temperature mixing process without using any special pressure conditions to thereby form the components of the composition into a homogeneous mass which converts into a dough by the mere mixing at the low temperatures. This dough is sufficient for forming the pet food in a standard fashion. For example the dough may be shaped and packaged.

During mixing, a pressure ranging from 0 to 5 psig may be achieved. This low pressure does not adversely affect the formation of the pet food dough. Pressures much higher than 5 psig are not necessary and do not materialy help the processing of the pet food. Typical examples of suitable mixers are a dough mixer or a Hobart grinder. Other mixers are also suitable for use as long as the pressure and temperature conditions for the process are met.

An especially suitable process for forming the soft dry pet food includes mixing and pasteurizing the meat and bone meal with the polyhdyric component in water. The pasteurized mix is then removed from the mixing stage and cooled. The remaining ingredients for use in the soft dry pet food but for the emulsifying agent are blended, at a temperature of less than about 130° F. As those ingredients are blended, the emulsifying agent is added slowly. This blend is then added to the pasteurized mix and mixed at less than 130° F. If necessary processing water is added to the mix, at less then 130° F. By processing water is meant that water necessary to carry out the process of mixing the ingredients of the pet food. A more preferable temperature range is above freezing to 130° F. with 60° F. to 80° F. even more preferred and 65° F. to 80° F. most preferred.

If a marbled appearing pet food is desired, a white dough is mixed at less than 130° F. The white dough is formed into sheets at less than 130° F. Then the sheets are added to the red dough while the red dough is being mixed at less than 130° F. The above referenced temperature ranges are operable here for the marbled pet food too. A suitable weight ratio of red dough to white dough is 2:1 to 7:1. More preferably, the ratio of red dough to white dough is 3:1 to 6:1.

Customarily the pet food of this invention is shaped into bite-sized chunks. Bite-size varies with the size of the pet being fed and is easily adjusted by a person having ordinary skill in the pet food art. Likewise shape of the chunk varies and is also easily adjusted by a person having ordinary skill in the art. Generally the chunk has a volume of up to 5 cubic centimeters. More preferably the chunk has a volume of 0.5 to 4 cubic centimeters. More preferably the chunk has a volume of 1 to 2 cubic centimeters.

If desired, the chunks thus formed may be coated. The coating can improve shape, appearance, and palatability even more than the already unique appearance of this pet food does. The coating can comprise up to about five percent by weight of the chunk. More preferably 0.5 percent to 4 percent is the coating weight. Most preferably 1 percent to 2 percent is the coating weight. An especially preferred coating is corn oil. Other vegetable or animal fat coatings are also suitable for use. Typical coating materials are listed in U.S. Pat. No. 3,467,525 to Hale et al. incorporated herein by reference.

In the following examples which are intended to illustrate without unduly limting the invention, all parts and percentages are by weight unless otherwise specified.

EXAMPLE I

The following ingredients are assembled for preparing a dry, soft meat-like pet food containing less than 15 percent moisture and which has the texture and appearance of lean meat.

|   |   | % |
|---|---|---|
| 1) | Soy Flour 200W | 30.00 |
| 1) | Maltrin 20 | 27.90 |
| 2) | Soy Lecithin | 2.00 |
| 1) | Defluorinated Phosphate | 4.50 |
| 1) | Sodium Chloride | 1.00 |
| 1) | Potassium Chloride | 0.30 |
| 1) | Vitamin-mineral Premix | 0.60 |
| 3) | Meat & Bone Meal | 14.00 |
| 3) | Sorbitol 70% Solution | 10.00 |
| 3) | Water | 9.35 |
| 1) | Potassium Sorbate | 0.10 |
| 1) | FD&C Red No. 40 | 0.15 |
| 1) | Iron Oxide | 0.10 |
|   |   | 100.00 |

Item (3) ingredients are placed in an open steam jacketed kettle equipped with a stirrer and heated while stirring to 100° C. for 20 minutes. The pasteurized mix is then removed from the kettle, and cooled to ambient temperature. Item (1) ingredients are placed in a ribbon mixer and blended for about 3 minutes at which time item (2) ingredient is added slowly, while blending, and blending continued for an additional 3 minutes. At this time the item (1) and (2) blended ingredients and the item (3) pasteurized mix are placed in a Sigma Blade dough mixer and 4 pounds of process water is added to 200 pounds of mix while mixing at room temperature. Mixing continues for about 20 minutes at room temperature during which time the dough develops into a cohesive, elastic, meat-like textured mass. Upon completion of mixing the developed dough is passed through a Hobart grinder, Model No. 4046 fitted with a die plate containing a multiplicity of ½ inch die holes. The heat developed by friction is kept below about 130° F. product temperature by limiting the throughput rate or by cooling by suitable means. The essentially continuous strands of extrudate are then passed through an Urschel Model J dicer to form bite size chunks of dry dog food product. The chunk product containing about 17 percent moisture is then placed on perforated trays and air dried at less than 130° F. to less than 15 percent moisture, and coated by tumbling with 1 percent by weight corn oil.

EXAMPLE II

This example illustrates the preparation of a dry, soft, meat-like dog food containing less than 15 percent moisture and which has the texture and appearance of lean meat and wherein a diastatically treated oat flour is substituted for Maltrin 20.

|   | % |
|---|---|
| Soy Flour 200W | 30.00 |
| Diastatically Treated Oat Flour | 28.12 |
| Soy Lecithin | 2.00 |
| Defluorinated Phosphate | 4.50 |
| Sodium Chloride | 1.00 |
| Potassium Chloride | 0.30 |
| Vitamin-mineral Premix | 0.60 |
| Meat & Bone Meal | 14.00 |
| Sorbitol 70% Solution | 10.00 |
| Water | 9.35 |
| Potassium Sorbate | 0.10 |
| FD&C Red No. 40 | 0.02 |
| Iron Oxide | 0.10 |
|   | 100.00 |

Procedure is the same as shown in Example I.

EXAMPLE III

This example illustrates the method of preparing a dry, soft, meat-like dog food that is marbled in appearance.

|   | A<br>Red Dough<br>% | B<br>White Dough<br>% |
|---|---|---|
| GR. Solvent Soybean Meal | 30.00 | — |
| Soya Fluff 200W | — | 40.00 |
| Maltrin 15 | 20.00 | 30.50 |
| Oat Flour | 7.02 | — |
| Defluorinated Phosphate | 4.50 | 4.50 |
| Sodium Chloride | 1.00 | 0.60 |
| Potassium Chloride | 0.30 | 0.30 |
| Vitamin-Mineral Premix | 0.60 | — |
| Meat & Bone Meal | 14.00 | — |
| Sorbitol 70% Solution | 10.00 | 10.00 |
| Water | 9.35 | 10.00 |
| Potassium Sorbate | 0.10 | 0.10 |
| Soy Lecithin | — | 2.00 |
| Titanium Dioxide | — | 2.00 |
| FD&C Red No. 40 | 0.075 | — |
| Iron Oxide | 0.05 | — |
| Prime Steam Lard | 3.00 | — |
|   | 100.00 | 100.00 |

Procedure: Red dough is prepared in the manner of Example I. White dough ingredients are placed in a Hobart mixer with paddle and mixed with a paddle until a cohesive dough develops at which time the paddle is replaced with a dough hook and mixing continues for about 10 minutes. The dough is then sheeted by passing through a set of rolls, and the sheeted dough is collected in the form of sheets or strips about 1/16 inches thick. Marbling is accomplished by adding pieces of sheeted white dough to the semi-developed red dough during mixing of the red dough. The marbled dough is then cut into bits size chunks, air dried to less than 15 percent moisture and given a meat-like sheen or polish by tumbling in a rotary mixer and coating with 1 percent corn oil.

Having thus described and completely disclosed the invention sought to be patented, what is claimed and desired to be secured by Letters Patent of the United States is:

1. A soft, dry pet food containing up to 15 percent moisture comprising:
    a. about 20 percent to about 40 percent of a starch-derived polysaccharide having a dextrose equivalent of 6–35;

b. about 3 percent to about 12 percent of polyhydric plasticizing agent having humectant capabilities;
c. about 0.01 percent to about 0.2 percent of a mold inhibitor;
d. from a trace to about 18 percent of a meat and bone meal;
e. 0 to about 5 percent of a calcium phosphorus source;
f. 0 to about 5 percent of an emulsifying agent; and
g. from a trace to about 40 percent of a vegetable protein source.

all percentages being based on the total weight of the pet food.

2. The pet food of claim 1 wherein the pet food is marbled.

3. The pet food of claim 1 wherein the starch is present in the pet food at 20 percent to 35 percent.

4. The pet food of claim 1 wherein:
a. the dextrose equivalent is 9 to 25;
b. the polysaccharide is present at 20 percent to 30 percent; and
c. the polysaccharide has a carbohydrate content of monosaccharides at 0.0 to 1.0 percent; disaccharides at 2.0 to 6.0 percent; trisaccharides at 2.5 to 8.0 percent; tetrasaccharides at 2.0 to 7.0 percent; pentasaccharides at 1.0 to 6.0 percent; hexasaccharides at 3.0 to 9.0 percent; heptasaccharides at 4.5 to 10.0 percent; and higher saccharides 8.0 to 53.0 percent;

wherein the percentages of (c) are based on the weight of the starch-derived polysaccharide.

5. The pet food of claim 4 wherein the plasticizing agent is at least one selected from the group consisting of sorbitol, propylene glycol and glycerine.

6. The pet food of claim 5 wherein the plasticizing agent is sorbitol and the sorbitol comprises 8 percent to 10 percent by weight of the pet food.

7. The pet food of claim 6 wherein the protein content is 22 percent to 40 percent by weight of the pet food on a dry basis.

8. The pet food of claim 7 wherein the meat and bone meal comprises 8 percent to 14 percent.

9. The pet food of claim 8, wherein the emulsifying agent comprises 1 percent to 3 percent.

10. The pet food of claim 9, wherein the calcium phosphorus source comprises 3.5 percent to 4.5 percent.

11. The pet food of claim 10 wherein the pet food is marbled, and comprises a red portion of the pet food and a white portion of the pet food with the ratio of the red portion to the white portion ranging from 2:1 to 7:1.

12. A process for making a soft dry pet food wherein the pet food contains up to 15 percent moisture comprising:
a. pasteurizing a mixture of from a trace to about 18 percent meat and bone meal, water, and about 3 percent to about 12 percent of a polyhydric component — the polyhydric component functioning as both a plasticizing agent and a humectant;
b. cooling the pasteurized mixture to less than 130° F.;
c. blending a mixture of from a trace to 40 percent of a vegetable protein source, from about 20 to about 40 percent of a nutritious carbohydrate source in the form of a starch derived polysaccharide, and a sufficient amount of antimycotic to inhibit mold;
d. addint to the mixture of c) while blending 0 percent to about 5 percent of an emulsifying agent;
e. mixing the pasteurized mixture, and the mixture of d), and additional water to form a dough;
f. mixing the dough to form a meat-like textured mass at a temperature less than 130° F.; and
g. forming bite-size pieces of the textured mass by extrusion at less than 130° F. — all percentages being based on the weight of the pet food.

13. A process for making a marbled, soft, dry, pet food wherein the pet food contains up to 15 percent moisture comprising:
a. forming a red dough utilizing the steps of:
  i. pasteurizing a mixture of from a trace to about 18 percent meat and bone meal, water, and about 3 percent to about 12 percent of a polyhydric component, the polyhydric component serving as both a plasticizing agent and a humectant;
  ii. cooling the pasteurized mixture to less than 130° F;
  iii. blending at less than 130° F. a mixture of from a trace to about 40 percent vegetable protein source, from about 20 percent to about 40 percent nutritious carbohydrate source in the form of a starch derived polysaccharide, an antimycotic in sufficient amount to inhibit mold, and a red coloring source;
  iv. adding to the mixture of iii) while blending at less than 130° F. 0 percent to about 5 percent of at least one emulsifying agent; and
  v. mixing at less than 130° F. (ii) and (iv) to form the red dough;
b. forming a white dough utilizing the steps of:
  i. mixing at less than 130° F. from a trace to about 60 percent of a protein source, from about 20 percent to about 40 percent nutritious carbohydrate source in the form of a starch derived polysaccharide, 0 to about 5 percent of a phosphate source, about 3 percent to about 12 percent of a polyhydric plasticizing agent having humectant capabilities, water, sufficient amounts of an antimycotic to inhibit mold, about 1 percent to about 3 percent of an emulsifying agent, and a white color source to form the white dough; and
  ii. sheeting the white dough at less than 130° F.;
c. adding at least one piece of the sheeted white dough to the red dough while mixing at less than 130° F. to form a marbled dough; and
d. forming bite-size pieces of the marbled dough.

14. The process of claim 13 wherein the bite-sized pieces are dried to a moisture content of 8 percent to 12 percent.

15. The process of claim 14 wherein the pet food has a water activity of 0.60 to 0.75 and a hardness of 1.5 to 3.5.

16. The process of claim 14 further comprising coating the bite-size pieces of the pet food with an edible coating.

17. The process of claim 13 wherein the plasticizing agent is at least one selected from the group consisting of sorbitol, propylene glycol and glycerine.

18. The process of claim 17 wherein the plasticizing agent is sorbitol and the sorbitol comprises 8 percent to 10 percent by weight of the pet food.

19. The process of claim 18 wherein the protein content is 22 percent to 40 percent by weight of the pet food on a dry basis.

20. The process of claim 19 wherein the meat and bone meal comprises 8 percent to 14 percent.

21. The process of claim 20 wherein the emulsifying agent comprises 1 percent to 3 percent.

22. The process of claim 21 wherein the calcium phosphorus source comprises 3.5 percent to 4.5 percent.

23. The process of claim 22 wherein the marbled pet food comprises a ratio of the red dough to the white dough ranging from 2:1 to 7:1.

24. The process of claim 23 wherein:
a. the dextrose equvalent is 9 to 25;
b. the polysaccharide is present at 20 percent to 30 percent;
c. the polysaccharide has a carbohydrate content of
monosaccharides at 0.0 to 1.0 percent;
disaccharides at 2.0 to 6.0 percent;
trisaccharides at 2.5 to 8.0 percent;
tetrasaccharides at 2.0 to 7.0 percent;
pentasaccharides at 1.0 to 6.0 percent;
hexasaccharides at 3.0 to 9.0 percent;
heptasaccharides at 4.5 to 10.0 percent; and
higher saccharides 8.0 to 53.0 percent
wherein the percentages of (c) are based on the starch derived polysaccharide.

25. The process of claim 12 wherein the plasticizing agent is at least one selected from the group consisting of sorbitol, propylene glycol and glycerine.

26. The process of claim 25 wherein the plasticizing agent is sorbitol and the sorbitol comprises 8 percent to 10 percent by weight of the pet food.

27. The process of claim 26 wherein the protein content is 22 percent to 40 percent by weight of the pet food on a dry basis.

28. The process of claim 27 wherein the meat and bone meal comprises 8 percent to 14 percent.

29. The process of claim 28 wherein the emulsifying agent comprises 1 percent to 3 percent.

30. The process of claim 29 wherein the calcium phosphorus source comprises 3.5 percent to 4.5 percent.

31. The process of claim 30 wherein the marbled pet food comprises a ratio of the red dough to the white dough ranging from 2:1 to 7:1.

32. The process of claim 31 wherein:
a. the dextrose equivalent of the polysaccharide is 9 to 25;
b. the polysaccharide is present at 20 percent to 30 percent;
c. the polysaccharide has a carbohydrate content of
monosaccharides at 0.0 to 1.0 percent;
disaccharides at 2.0 to 6.0 percent;
trisaccharides at 2.5 to 8.0 percent;
tetrasaccharides at 2.0 to 7.0 percent;
pentasaccharides at 1.0 to 6.0 percent;
hexasaccharides at 3.0 to 9.0 percent;
heptasaccharides at 4.5 to 10.0 percent; and
higher saccharides 8.0 to 53.0 percent
wherein the percentages of (c) are based on the starch derived polysaccharide.

* * * * *